US007606170B2

(12) United States Patent
Fischer

(10) Patent No.: US 7,606,170 B2
(45) Date of Patent: Oct. 20, 2009

(54) METHOD AND APPARATUS FOR CONFIGURING A ROUTER, AND A COMPUTER PROGRAM PRODUCT

(75) Inventor: Axel Fischer, Wermsddorf (DE)

(73) Assignee: Siemens Aktiengesellschaft, Munich (DE)

( * ) Notice: Subject to any disclaimer, the term of this patent is extended or adjusted under 35 U.S.C. 154(b) by 541 days.

(21) Appl. No.: 11/141,616

(22) Filed: May 31, 2005

(65) Prior Publication Data

US 2006/0013236 A1  Jan. 19, 2006

(30) Foreign Application Priority Data

Jun. 3, 2004  (DE)  ........................ 10 2004 027 160

(51) Int. Cl.
*H04L 12/28* (2006.01)
(52) U.S. Cl. .................................................. 370/254
(58) Field of Classification Search ................ 370/254, 370/351, 400–402; 709/217–220
See application file for complete search history.

(56) References Cited

U.S. PATENT DOCUMENTS

| 5,898,835 | A  | * | 4/1999  | Truong ........................ 709/217 |
| 6,012,088 | A  | * | 1/2000  | Li et al. ...................... 709/219 |
| 6,023,724 | A  | * | 2/2000  | Bhatia et al. ................ 709/218 |
| 6,490,349 | B1 | * | 12/2002 | Garfinkel et al. ......... 379/265.02 |
| 6,519,644 | B1 | * | 2/2003  | Lindquist et al. ............ 709/227 |
| 6,704,401 | B2 | * | 3/2004  | Piepho et al. ........... 379/102.03 |
| 6,850,528 | B1 | * | 2/2005  | Crocker et al. .............. 370/401 |
| 6,938,089 | B1 | * | 8/2005  | Slaby et al. ................. 709/229 |
| 7,016,949 | B1 | * | 3/2006  | Tagawa ...................... 709/223 |
| 2002/0157018 | A1 | * | 10/2002 | Syvanne ..................... 713/200 |
| 2002/0198969 | A1 |   | 12/2002 | Engel et al. |
| 2003/0023621 | A1 | * | 1/2003  | Muse ......................... 707/204 |
| 2003/0074437 | A1 |   | 4/2003  | Siemens |
| 2003/0217126 | A1 | * | 11/2003 | Polcha et al. ............... 709/220 |
| 2004/0002982 | A1 | * | 1/2004  | Ersek et al. ................. 707/100 |
| 2005/0147224 | A1 | * | 7/2005  | Olafsson et al. .......... 379/93.35 |
| 2005/0267966 | A1 | * | 12/2005 | Boston ....................... 709/224 |
| 2006/0106919 | A1 | * | 5/2006  | Watkinson et al. .......... 709/220 |

FOREIGN PATENT DOCUMENTS

DE  10146397 A1  4/2003

\* cited by examiner

*Primary Examiner*—Frank Duong
(74) *Attorney, Agent, or Firm*—Brinks, Hofer, Gilson & Lione

(57) ABSTRACT

A method is provided for configuring a router of a first local-area network in a communication network, having a second local-area network in communication with the first local-area network via the router. Configuration data for the router from an external communication device of the second local-area network is inputted via a dynamic web page of a remote server. An automatic communication connection with the router is established via the remote server. The configuration data is transmitted to the router.

20 Claims, 3 Drawing Sheets

METHOD AND APPARATUS FOR CONFIGURING A ROUTER, AND A COMPUTER PROGRAM PRODUCT

BACKGROUND

The invention relates, in general, to communications via gateways or routers, and more particularly, to a method and an apparatus for configuring a router of a local-area network (LAN), such as a corporate network or Intranet, in a communication network with a wide-area-network (WAN) connected or linked via the router, such as the worldwide web WWW or Internet.

In a communication network, the router serves as an interface between a plurality of networks, such as a plurality of local-area networks, or one global network and one local-area network, and via the router all the local communication subscribers or users of a particular network are able to communicate simultaneously with another network, such as the Internet or an Intranet, via a communication connection, such as an ISDN connection (Integrated Services Digital Network). A firewall or a firewall-router combination is also considered to be a router. In other words, the router is a piece of switching equipment in the communication network, for transmitting data from one communication subscriber to another external communication subscriber or user on the basis of a protocol, such as the Internet protocol, associated with the data transmitted or forwarded.

Typically, one router can connect various communication networks or computer networks to one another, such as the local-area network and the external computer network of a business. Moreover, the router may be configured such that firewall functions are fulfilled. The firewall functions can be fulfilled if a packet filter is realized via the router. This packet filter typically forwards only data or data sets of a predetermined type, predetermined addresses of origin and/or destination, predetermined ports of origin and/or destination, and/or possibly data with predetermined flags, depending on a configuration that has been predetermined or set.

Before the user can access certain computer programs of a local-area computer network from a computer or device of an external computer network, the router needs to be configured in a suitable way. Typically, this router configuration is done manually by an administrator, who is usually also responsible for problem-free operation of the local-area network. Before the administrator configures the router in this suitable way, the user as a rule can make a request to gain access to the desired computer program. The administrator thereupon checks whether the user even has the right to access the computer program the user has requested, and then performs a technical risk analysis, with the aid of which possible risks to security should at least be limited. Based on the technical risk analysis, the administrator could for instance be assured that the user has access only to the computer program he requested, or is prevented from gaining unauthorized access to that requested computer program and/or other computer programs or to a communication subscriber or computer of the local computer network. On the basis of the technical risk analysis, an administrator for instance determines suitable packet or port filters, or a suitable host routing. Next, the administrator configures the router in the suitable way that enables the user to access the requested computer program.

However, the above described process may be relatively time-consuming, and as a rule may only be performed by a specialist, such as the administrator.

From German Patent Disclosure DE 101 46 397 A1, a method for configuring a firewall or a router is known in which a first computer or a first computer network is connected to a second computer network via the firewall or the router, and the router or the firewall is configured such that communication between a computer in the second computer network and the first computer, or a predetermined computer of the first computer network, is made possible once a predetermined request form is filled out, which is automatically translated into a code suitable for the configuration of the firewall or the router. As such, a deadline is agreed upon with a central station or communication center for when the configuration will be performed, online, from the central station. A disadvantage of this method is that coordination is more difficult given the need to agree on a deadline with the central station and the time differences involved in worldwide use, so that potentially several visits on site by technicians or administrators are required.

OBJECT AND SUMMARY

The present invention is defined by the appended claims. This description summarizes some aspects of the present embodiments and should not be used to limit the claims.

One object is to disclose a method and an apparatus for configuring a router.

One concept is that upon configuration of a router of a local-area network, on-site configuration with the effort and expense which that involves may be prevented or limited. A simpler configuration can be made available. As such, the concept provides that by an arbitrary external communication subscriber, who is bound in a different remote local-area network, and via a dynamic web page (webpage) of a remote server, configuration data for the applicable or involved router of the local-area network are input, and a communication connection to the router is automatically established by the remote server, and the configuration data are transmitted to the router automatically once the communication connection has been successfully made.

The term "dynamic web page" is understood in particular to mean or refer to an HTML document (HTML=Hyper-Text Markup Language), which for inputting the configuration data includes control elements, such as tags or ActiveX control elements. The control elements are interactive software components of the HTML document, and indicate for instance how a user should act, such as inputting data from a keyboard or by clicking with a mouse. A dynamic web page thus has variable contents. The term "remote server" is understood to be a conventional computer or personal computer that includes server software which supports an Internet protocol, such as the http protocol, which transits or transmits the HTML documents to a user upon request by the user. Once the HTML document has been sent, as a rule the connection between user and server is broken off.

The method is used for final settings or adjustments of the router that is to be newly set up, or for changing the configuration of an already existing router in a communication network, such as a corporate network, via a dial-up connection, but also via the Internet. The settings may pertain to new or modified remote connections or communication connections between the router and the remote server. The dial-up connection, for instance by ISDN, is an economical way of achieving this set-up, since resources are occupied or busy only as needed. However, a dedicated communication line may also be used.

In one possible embodiment, the dial-up connection is initiated by the remote server, and the remote server keeps trying the dial-up connection until a communication connection has been established, or until a predetermined time has elapsed. The initiation of the dial-up connection by the remote server makes coordinated triggering of the router possible, while balancing timing with other server services. For the repeated dial-up attempts until a communication connection is made or until a predetermined time has elapsed, a predetermined error tolerance is implemented, which is configured to limit or minimize the effort and expense of transmission.

In another embodiment, the dial-up connection may be initiated by the router. In this case, the transmission of the configuration data may be started by the remote server. The initiation of the dial-up connection by the router, for routers already configured to be capable of dialing up, may establish a communication connection. If the transmission is initiated by the server, when the communication connection already exists, the configuration data may be transmitted in regular or typical dial-up operations of the router. This router dial-up is used whenever, for security reasons, for instance, a router does not allow dial-up from outside.

For a secure and substantially precise configuration of the router in terms of the configuration data that also takes various applications into account, the configuration data are checked in the server and/or the router for plausibility and correctness. As such, even in an automatic transmission of the configuration data from an external communication subscriber to the router, the configuration of the router on the basis of the configuration data transmitted is not done until after the configuration data have been substantially checked. This checking of the configuration data reliably avoids or minimizes an erroneous configuration of the router. Checking the identification data and/or configuration data input after they have been input substantially prevents incorrect settings that may impair the function of the router.

For checking configurations that have already been made, or for checking for updating of transmitting configuration data, the configuration data are stored in memory in the server and/or the router. Newly received configuration data are checked on the basis of the stored and already used configuration data. If the configuration data match, updating of the configuration of the router need not be done; otherwise, the new configuration data, after a check for plausibility and correctness and optionally a check for completeness, are used for configuring the router.

In another embodiment, the transmitted configuration data are activated with a time delay (i.e. in delayed fashion). As such, for instance upon a remote access over a great distance with major differences in time zones, involving for instance a local-area network with a router in Asia and a remote server in the local-area network used by a user or administrator in Europe, the updating of the configuration data for the router can be activated in delayed fashion. Updating the router on the basis of the configuration data can also be done in delayed fashion, for instance at a predetermined time. Particularly when restarting the router is necessary after a reconfiguration, the reconfiguration can be started at night, for instance.

For changing the setting of the router and thus changing a configuration of the router by an authorized person or administrator, identification data may be input by the external communication subscriber via the dynamic web page. From the identification data, an authorization for access to the web server or remote server for the applicable router is checked.

The configuration data required for setting the router are automatically ascertained, after identification data and/or configuration data have been input into the dynamic web page. The web page is available worldwide. The data input can be done on the site of the router to be configured, or at any other site, such as an external communication subscriber. The configuration data that have been input and/or transmitted may be transmitted automatically by the remote server to the router, such as transmitted in a form that is readable by the router, once a communication connection between the remote server and the router has been made. This communication connection may be initiated by either side—the server or the router. The configuration data to be ascertained for the identification data and authorization data that have been input are stored in a database, from which they can be extracted on the basis of the identification data and authorization data that have been input. The configuration data can also be generated dynamically after the input, such as to enable individual generation of rules for a firewall.

In another embodiment, substantially fast and flexible inputting or modification of router and/or firewall configurations, and especially with a remote connection, is possible. The manual help from a central device can be dispensed with. The configuration can be performed by the automatic transmission of the configuration data and their activation, and in particular without router skills. Security is not impaired or compromised, since the configuration is adequately well protected because of the identification data and/or authorization data, for instance in the form of passwords or electronic keys. A need for technicians to travel to the router may no longer be necessary.

Illustrative and exemplary embodiments of the invention are described in further detail below with reference to and in conjunction with the figures.

DETAILED DESCRIPTION OF THE DRAWINGS

Figure 1:
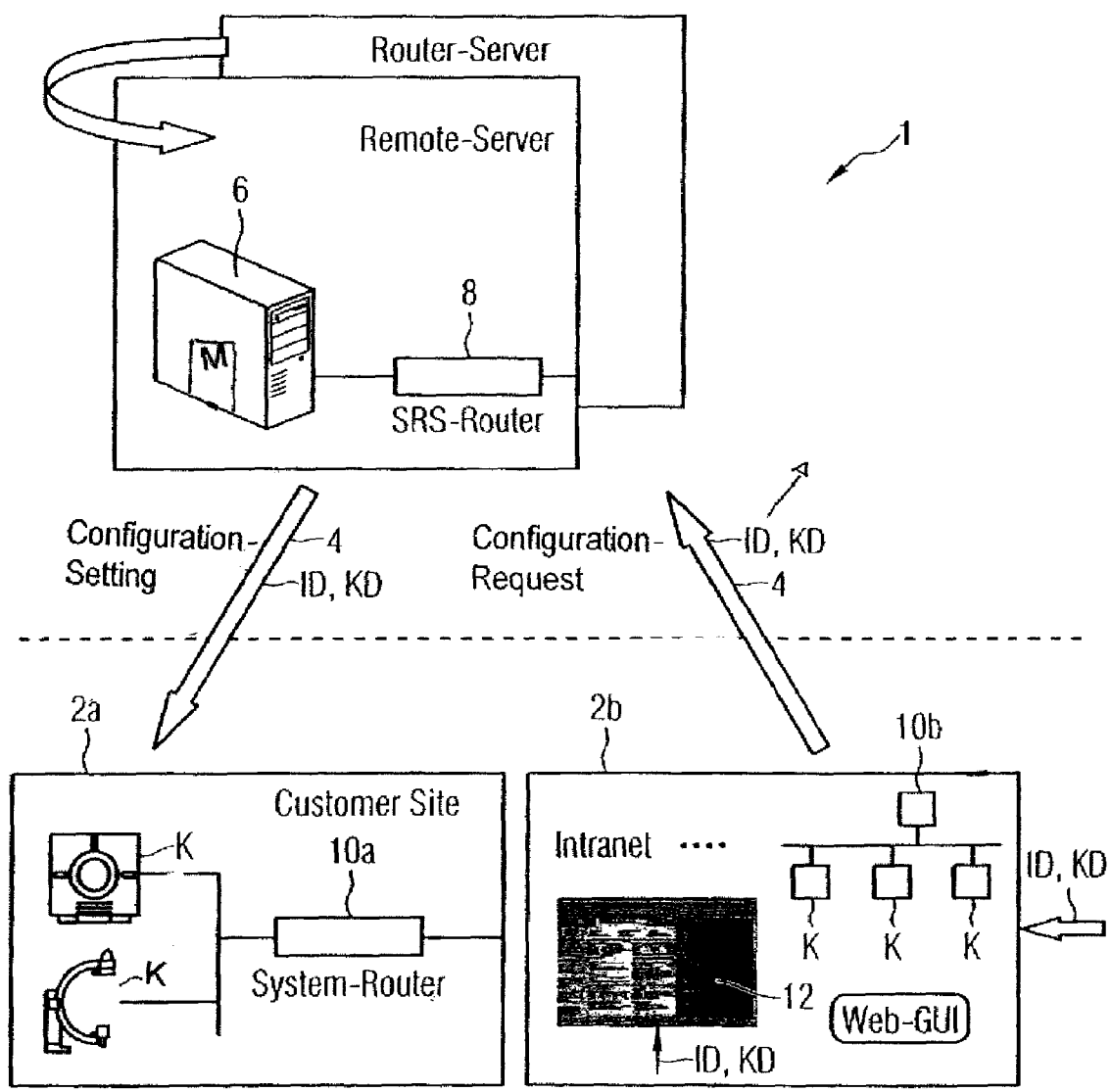
FIG. 1 is a schematic of a communication network with a local-area network that is connected via a router to a different remote local-area network in one embodiment.

Elements corresponding to one another are identified by the same reference numerals in all the drawings.

In FIG. 1, a communication network 1 is shown which includes a first local-area network 2a, such as a computer network of a technical system, such as an office, an industrial plant, a school, a factory or so forth, and a second remote local-area network 2b, such as a computer network of a corporation, for instance an Intranet. The two local-area networks 2a, 2b and their associated communication subscribers K can exchange data with one another, for instance via a communication connection 4.

A remote server 6 (e.g., a web server) is assigned to the local-area networks 2a and/or 2b. The remote server 6 provides access or communication by one local-area network 2a to a different local, distant network 2b, or vice versa, and/or to a global network, such as Internet, and its services, such as the WWW service. In a manner not shown in further detail, the remote server is in communication with the local-area networks 2a, 2b via the Internet and an associated remote router 8 on the one hand, or via a direct ISDN connection on the other. The remote router 8 may be a short message service (SRS) router.

Moreover, the remote server 6 can make Internet services, as WWW service, available to the communication subscribers K of the local-area networks 2a, 2b. As such, the respective local-area network 2a, 2b has an associated router 10a and 10b, respectively. The router 10a, 10b of the respective local-area network 2a, 2b, via a switch (not shown), makes a communication connection 4 possible for the associated communication subscribers K, for instance an Internet connection or a direct dial-up connection, to the remote server 6. In the case of a dial-up connection, for instance, the respective router 10a, 10b may be connected to a telephone network via an ISDN system in a manner not further shown.

If the local-area networks 2a, 2b are networks at a branch location of a business that is active globally, then upon shipping and installation of the particular local-area network 2a and 2b, the respective associated router 10a and 10b is preconfigured for the communication connections 4. Once the particular local-area network 2a, 2b and thus the associated router 10a, 10b have been put into operation, data can be exchanged via the communication connections 4.

For an automatic configuration or modification of the configuration of the particular router 10a, 10b, the remote server 6 may include, as a service or application, the WWW service, for instance, to which a user has access to the router 10a of the first local-area network 2a from one of the communication subscribers K, such as the second local-area network 2b, via a dynamic web page 12 of the remote server 6 via the communication connection 4.

For the communication connection 4 between the communication subscribers K of the second local-area network 2b and the remote server 6, a dial-up connection or direct dial-up may be used. Once the connection has been successfully made, the dynamic web page 12 may be called up by the applicable communication subscriber K. The dynamic web page 12 may serve to input configuration data KD for the router 10a of the first local-area network 2a. For instance, as the configuration data KD, telephone numbers, present or future IP addresses, and the gateway of the applicable router 10a are input. Depending on how the dynamic web page 12 is configured, identification data ID, for instance in the form of a password or codeword, can be input in addition. Once the identification data ID has been successfully checked and the communication connection 4 has been enabled, the configuration data KD for the router 10a that have been input via the dynamic web page 12 are then transmitted from the external communication subscriber K of the remote local-area network 2b to the remote server 6.

Next, the configuration data KD ascertained in a server are transmitted via a communication connection 4 between the remote server 6 and the applicable first local-area network 2a to its router 10a. A dial-up connection may be used as the communication connection 4. Depending on the specification, the dial-up connection may be initiated by the remote server 6 or the applicable router 10a. In the case of dial-up by the remote server 6, the dial-up connection may be attempted until the communication connection 4 has been made, or a predetermined time has elapsed. Once the dial-up has been successful, the configuration data KD may be automatically transmitted to the router 10a by the remote server 6.

In the event that the dial-up is initiated by the router 10a, the transmission of the configuration data KD may be started by the remote server 6. In addition, the configuration data KD can be checked for plausibility and correctness either in the server before a transmission or in the router after a transmission. As such, an incorrect setting of the router 10a to be reconfigured may be reliably prevented. Moreover, the configuration data KD can be stored in the server and/or in the router in a data store or memory M. The entire method described here may also be performed in reverse order, if desired. That is, a communication subscriber K of the first local-area network 2a may configure the router 10b of the second local-area network 2b on the basis of new configuration data KD.

The method for configuring one of the routers 10a, 10b will now be described in further detail in terms of the flow charts of FIGS. 2 and 3.

Figure 2:
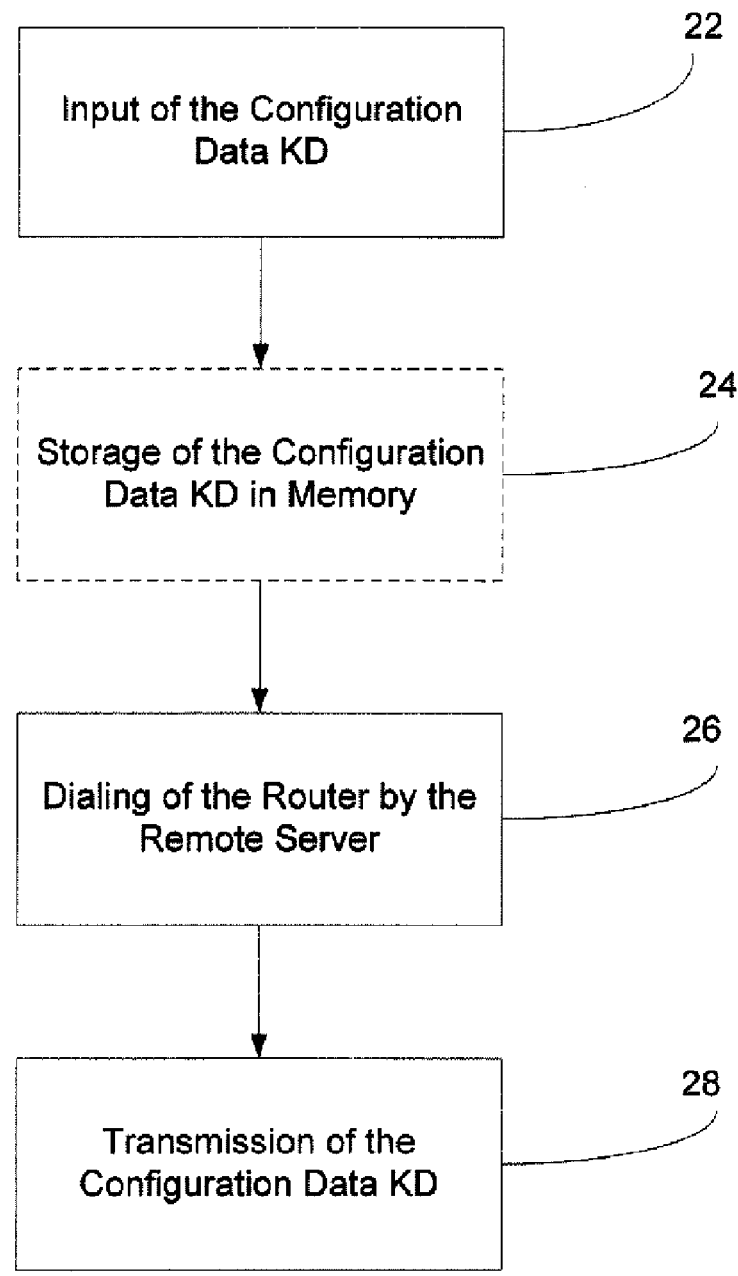
FIG. 2 is a flow chart of one embodiment of the method for configuring a router with active dial-up by an external communication subscriber, such as a web server, in the local-area network.

FIG. 2 shows a flow chart with the following sequence. After the configuration data KD have been input via the dynamic web page 12, at act 22, and the web page 12 has been sent, the configuration data KD are checked for plausibility and correctness, for instance via a Common Gateway Interface (CGI) script. As such, a comparison with known data is made, for instance. Furthermore, the input identification data ID, such as a codeword or password, are optionally checked for correctness and authorization. If the input data are correct, the configuration data KD which are intended for the router 10a or 10b and which may be composed entirely or in part of the input data, are stored in a database, at act 24. Once again, a comparison with already-stored data may be done, so that only new and modified configuration data KD are stored. Moreover, additional configuration specifications may be read out of the database and can continue to be used along with the configuration data KD that may have been input.

Next at act 26, via the remote server 6, an attempt at dialing the input telephone number is made, in order to construct an associated communications connection 4 with the applicable router 10a or 10b. The applicable router 10a or 10b is configured such that incoming data calls are accepted. The incoming connection is accepted only after successful checking for an access code, for instance on the basis of identification data ID. If a connection cannot be made successfully, then the attempt at establishing the dial-up connection by the remote server 6 may be repeated, for instance once an hour, until such time as either a communication connection 4 has been made or a predetermined time, such as 24 hours, has elapsed, or a maximum number of dial-up attempts, such as ten, has been rejected.

If the dial-up was successful, then via a suitable protocol that instructs the router 10a or 10b to receive the configuration data KD, these data are automatically transmitted to the router 10a or 10b, at act 26, where they are buffer-stored if needed, or the router configuration is updated directly with the configuration data KD transmitted. The dial-up connection is then terminated. If the transmitted configuration data KD have been buffer-stored, then the updating of the router configuration with the buffer-stored configuration data KD is done either immediately or after a delay, such as at a predetermined time, for instance at night.

Figure 3:
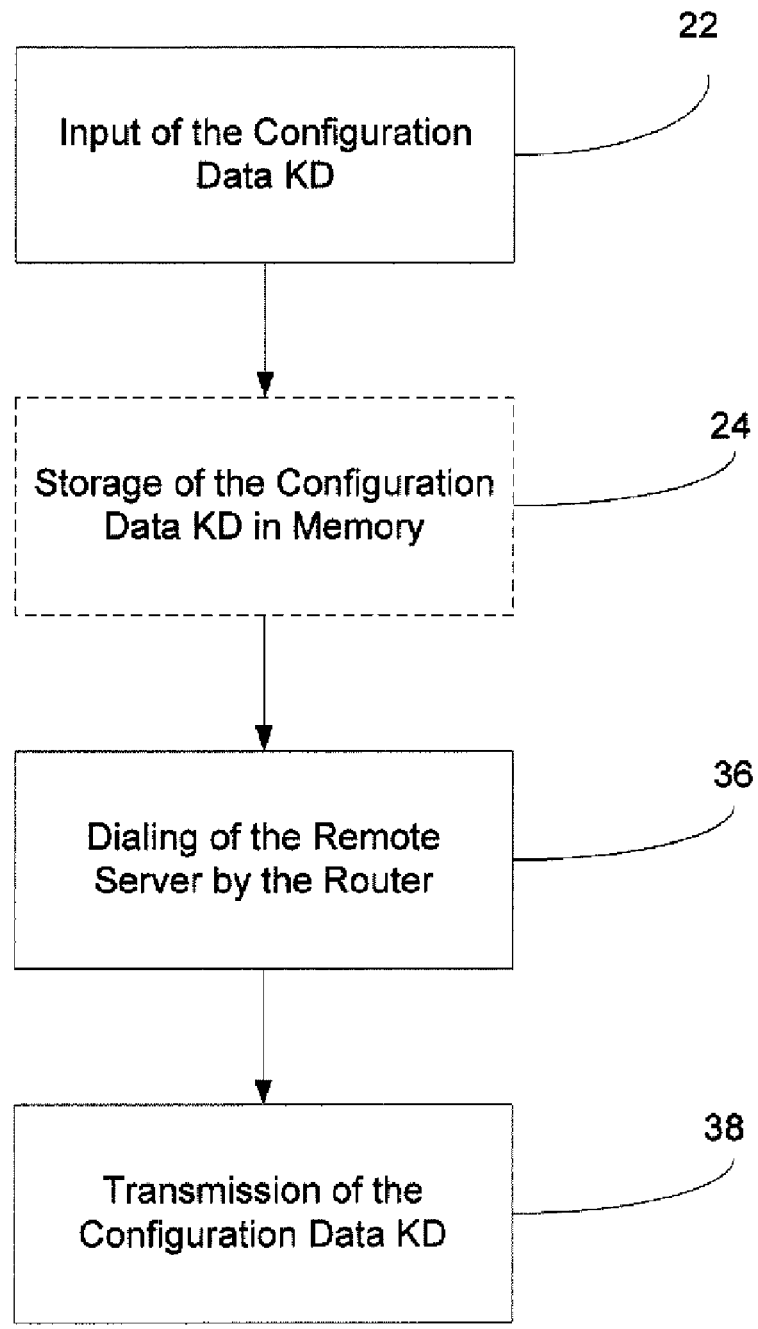
FIG. 3 is a flow chart of the method for configuring a router with active dial-up by the router itself in one embodiment.

In the flowchart of FIG. 3, the remote server 6 remains passive. That is, the applicable router 10a or 10b may already have a valid dial-up configuration with the remote server 6. If the applicable router 10a or 10b establishes a dial-up connection with the remote server 6, at act 36, the latter informs the router 10a or 10b, via a suitable protocol, that new or modified configuration data KD are present and need to be received. These data are then transmitted to the router 10a or 10b, where they are buffer-stored if needed or are used directly for router configuration on the basis of the configuration data KD transmitted, at act 38. Next, the regular communication sequences, on account of which the dial-up connection was established, may be performed or executed.

Alternatively, the dial-up connection may be terminated after the configuration data KD have been transmitted. If the configuration data KD transmitted are buffer-stored, so that the subsequent, regular communication sequences are already performed with the new configuration, the updating becomes effective only upon a newly initiated dial-up connection. The updating can also be done only after the regular communication sequences and after the termination of the dial-up connection, for instance, immediately afterward or after a delay, or at a fixed time, such as at night. If, for instance, the regular communication is time-critical, the updating can be done after the regular communication sequences and after the termination of the dial-up connection.

In both versions, that is, both with the active and with the passive remote server 6, the new or modified dial-up to the remote server 6 is now available to whichever local-area network 2a or 2b is the remote one.

For instance, if the IP address of the remote server 6, or the dial-up number for the active dial-up of the router 10a, 10b to the remote server 6 changes, then the configuration must be performed again. Changes in the identification data ID, such as changes in passwords, for the dial-up to the remote server 6 could also be forwarded in this way, if a corresponding chronological specification or arrangement is made or set up and the router 10a, 10b is capable or performing configuration changes at predeterminable times. Even without preconfigured Internet access, the method can be used, if the input of the identification data ID and/or configuration data KD is done via a different Internet connection, for instance from a different computer or communication subscriber K via a modem, or from a communication subscriber K outside the local-area networks 2a, 2b, such as from a laptop in a global network, and a corresponding communication connection 4 with the remote server 6 is constructed.

The invention claimed is:

1. A method for configuring a router of a first local-area network in a communication network, the communication network having a second local-area network in communication with the first local-area network via the router, the method comprising:
   inputting configuration data for the router from an external communication device of the second local-area network via a dynamic web page of a remote server;
   establishing automatically a communication connection with the router via the remote server;
   transmitting the configuration data to the router;
   storing, for a predetermined time period, the configuration data in the remote servers or router, the predetermined time period being a fixed time period;
   comparing the configuration data to current configuration data of the router; and
   updating a configuration of the router at the predetermined time period, the configuration of the router being updated when the configuration data is different than the current configuration data,
   wherein the configuration data is stored for the predetermined time period before updating the configuration of the router using the configuration data.

2. The method according to claim 1, wherein a dial-up connection is used as the communication connection.

3. The method according to claim 2, wherein the dial-up connection is initiated by the remote server, and the remote server repeats attempts, if initially unsuccessful, to establish the dial-up connection until the communication connection has been made or a predetermined time has elapsed.

4. The method according to claim 2, wherein the dial-up connection is initiated by the router and the transmission of the configuration data is started by the remote server.

5. The method according to claim 1, wherein the configuration data are checked for plausibility and correctness in the server, in the router or in both the server and the router.

6. The method according to claim 1, wherein transmitting the configuration data includes storing the configuration data in the remote server, router, or the combination thereof.

7. The method according to claim 1, wherein the fixed time period is at night.

8. The method according to claim 1, further comprising:
   inputting identification data by the external communication device via the dynamic web page.

9. The method according to claim 8, wherein on the basis of the identification data, an authorization of access to the remote server for the router is checked.

10. The method according to claim 1, wherein storing the configuration data in the remote server and router includes storing the configuration data when the configuration data is different than current configuration data of the router.

11. The method according to claim 5, wherein the configuration data are stored in a memory in the server, the router or both the server and the router.

12. The method according to claim 2, wherein the transmitted configuration data are activated in delayed fashion in the router.

13. The method according to claim 2, further comprising:
   inputting identification data by the external communication device via the dynamic web page.

14. The method according to claim 4, wherein the configuration data are checked for plausibility and correctness in the server, in the router or in both the server and the router.

15. The method according to claim 11, wherein the transmitted configuration data are activated in delayed fashion in the router.

16. The method according to claim 12, further comprising:
   inputting identification data by the external communication device via the dynamic web page.

17. A system for configuring a router of a first local-area network in a communication network, the communication network having a second local- area network in communication with the first local-area network via the router, the system comprising:
   a remote server communicatively located within the first or second local-area network, the remote server including a processor and a memory coupled to the processor, the memory storing configuration data and a dynamic interface program providing a dynamic webpage; and
   a communication device of the second local-area network, the communication device configured to input the configuration data for the router via the dynamic web page of the remote server,
   wherein a communication connection with the router is automatically established to transmit the configuration data to the router at a predetermined time.

18. A computer readable storage media for configuring a first router of a first local-area network in a communication network having a second local-area network in communication with the first local-area network via the first router, the computer readable storage media storing instructions for:
   inputting configuration data for the first router from a second router of the second local-area network via a dynamic web page of a remote server;
   establishing automatically a communication connection with the first router via the remote server; and
   transmitting the configuration data to the first router at a predetermined time period.

19. The instructions according to claim 18, wherein a dial-up connection is used as the communication connection, and wherein the dial-up connection is initiated by the remote server, and the remote server repeats attempts, if initially unsuccessful, to establish the dial-up connection until the communication connection has been made or a predetermined time has elapsed.

20. The instructions according to claim 18, wherein the second local-area network is an Intranet network including the second router and one or more communication devices connected to the second router.

* * * * *

UNITED STATES PATENT AND TRADEMARK OFFICE
CERTIFICATE OF CORRECTION

PATENT NO. : 7,606,170 B2  Page 1 of 1
APPLICATION NO. : 11/141616
DATED : October 20, 2009
INVENTOR(S) : Axel Fischer It is certified that error appears in the above-identified patent and that said Letters Patent is hereby corrected as shown below:

In the Claims

Column 7, claim 1, line 41, after "data in the remote" replace "servers" with --server--.

Signed and Sealed this

Twelfth Day of October, 2010

David J. Kappos
*Director of the United States Patent and Trademark Office*